Figure 1:
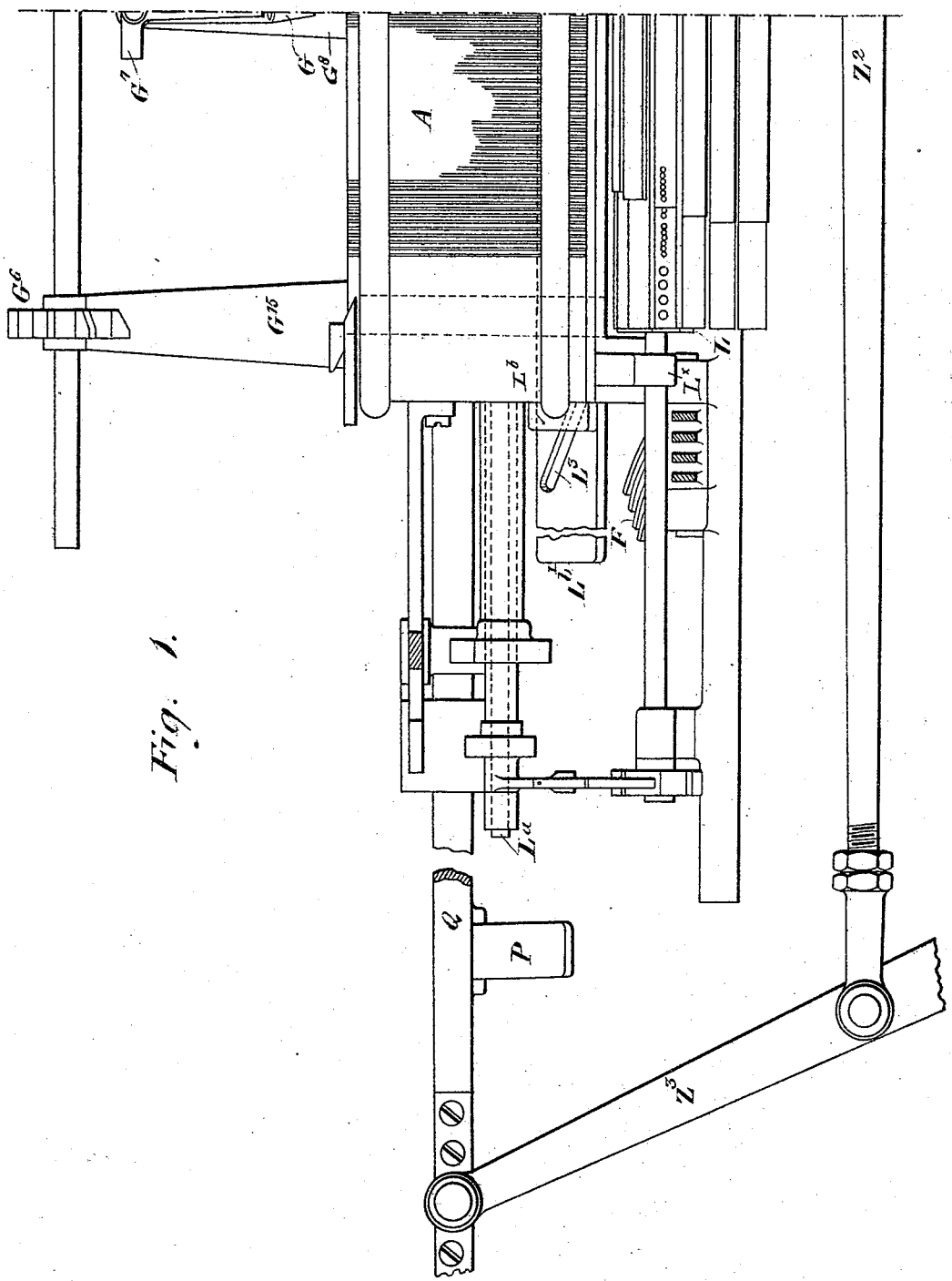

(No Model.) 15 Sheets—Sheet 1.

W. T. ROWLETT.
STRAIGHT KNITTING MACHINE.

No. 500,953. Patented July 4, 1893.

Witnesses. Inventor.

(No Model.) 15 Sheets—Sheet 2.
W. T. ROWLETT.
STRAIGHT KNITTING MACHINE.
No. 500,953. Patented July 4, 1893.
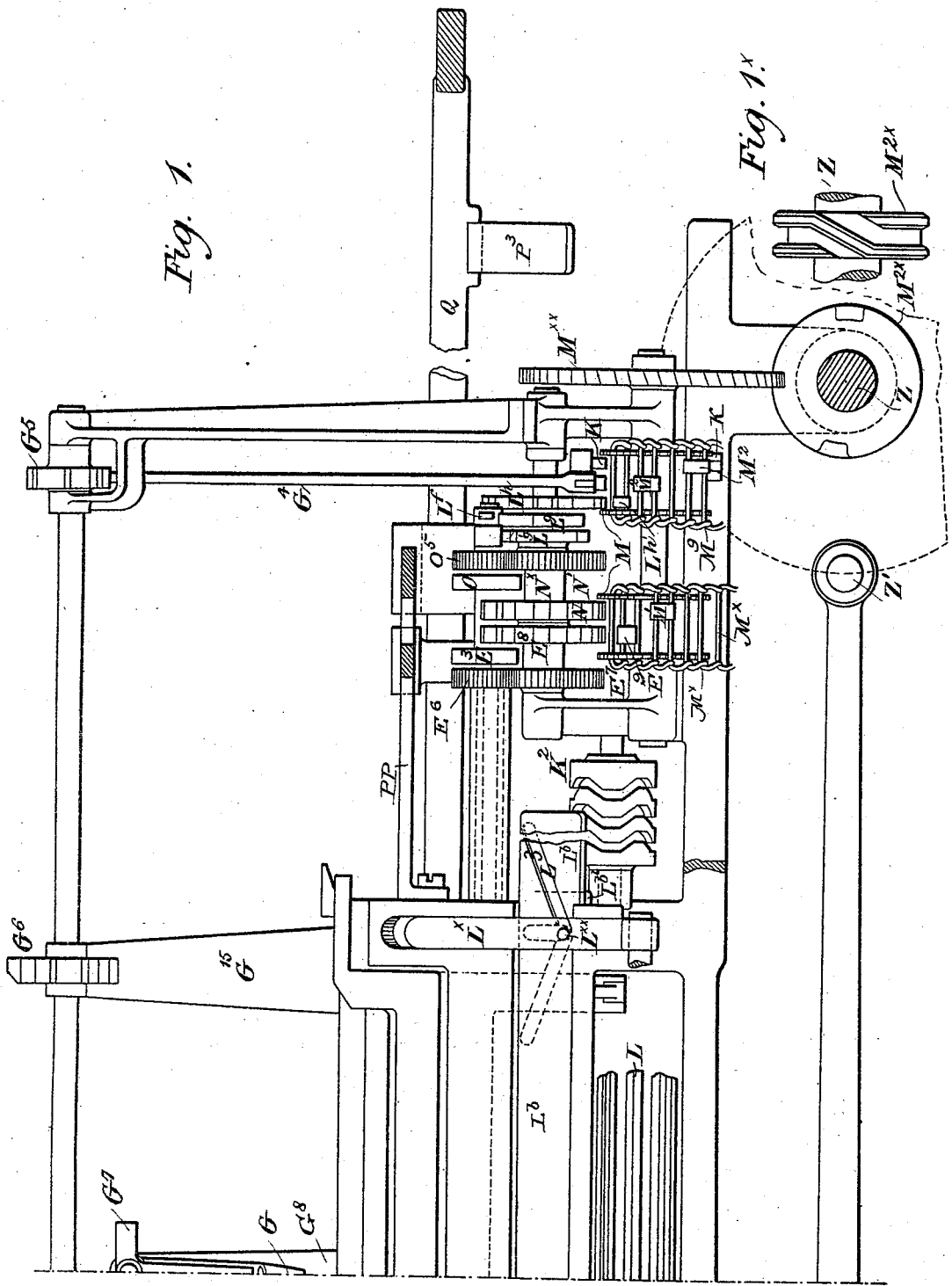
Witnesses.
George L. Dyer
Baltus De Long
Inventor:
William Tertius Rowlett
By his Att'ys
Baldwin Davidson & Wight

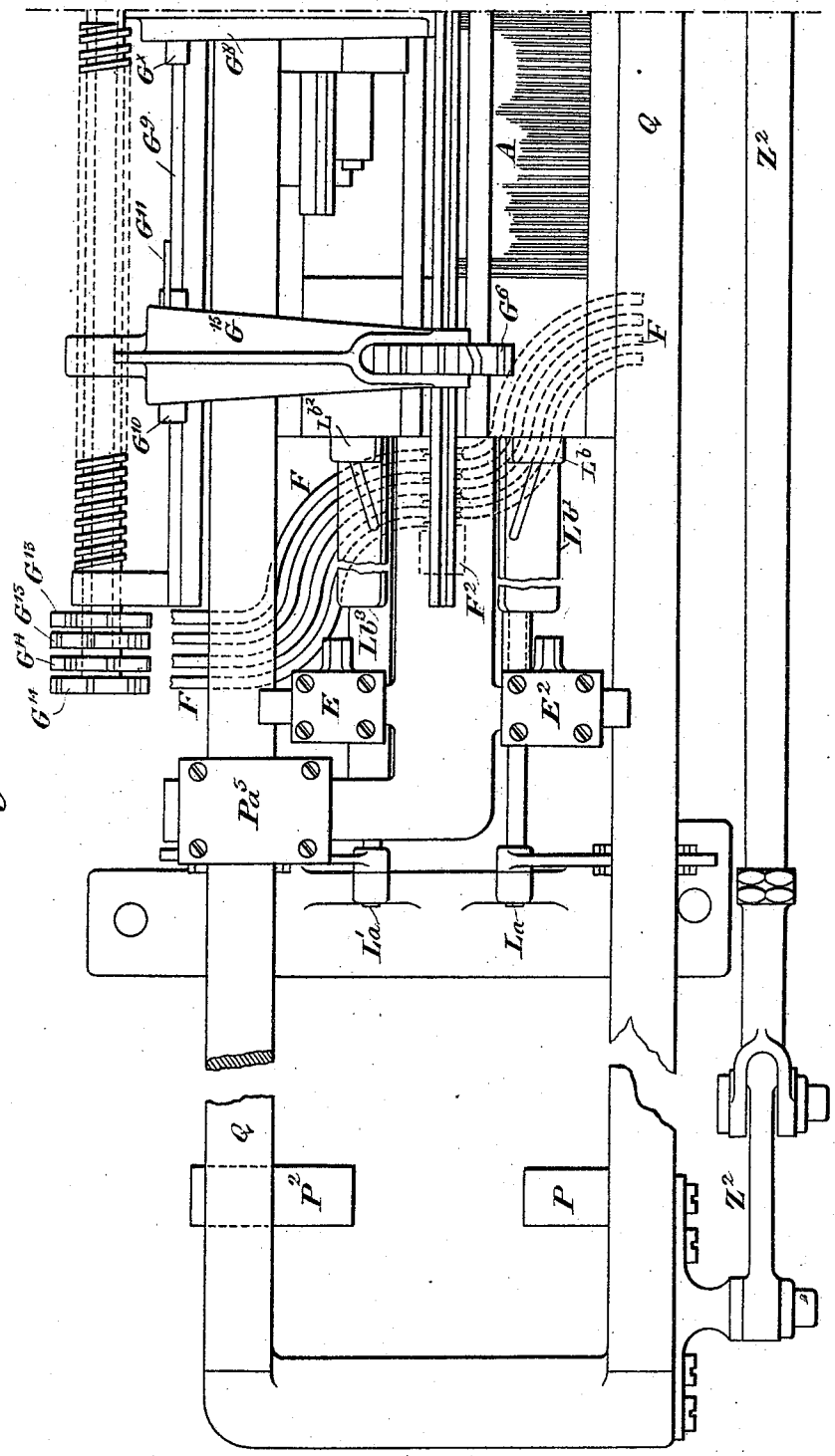

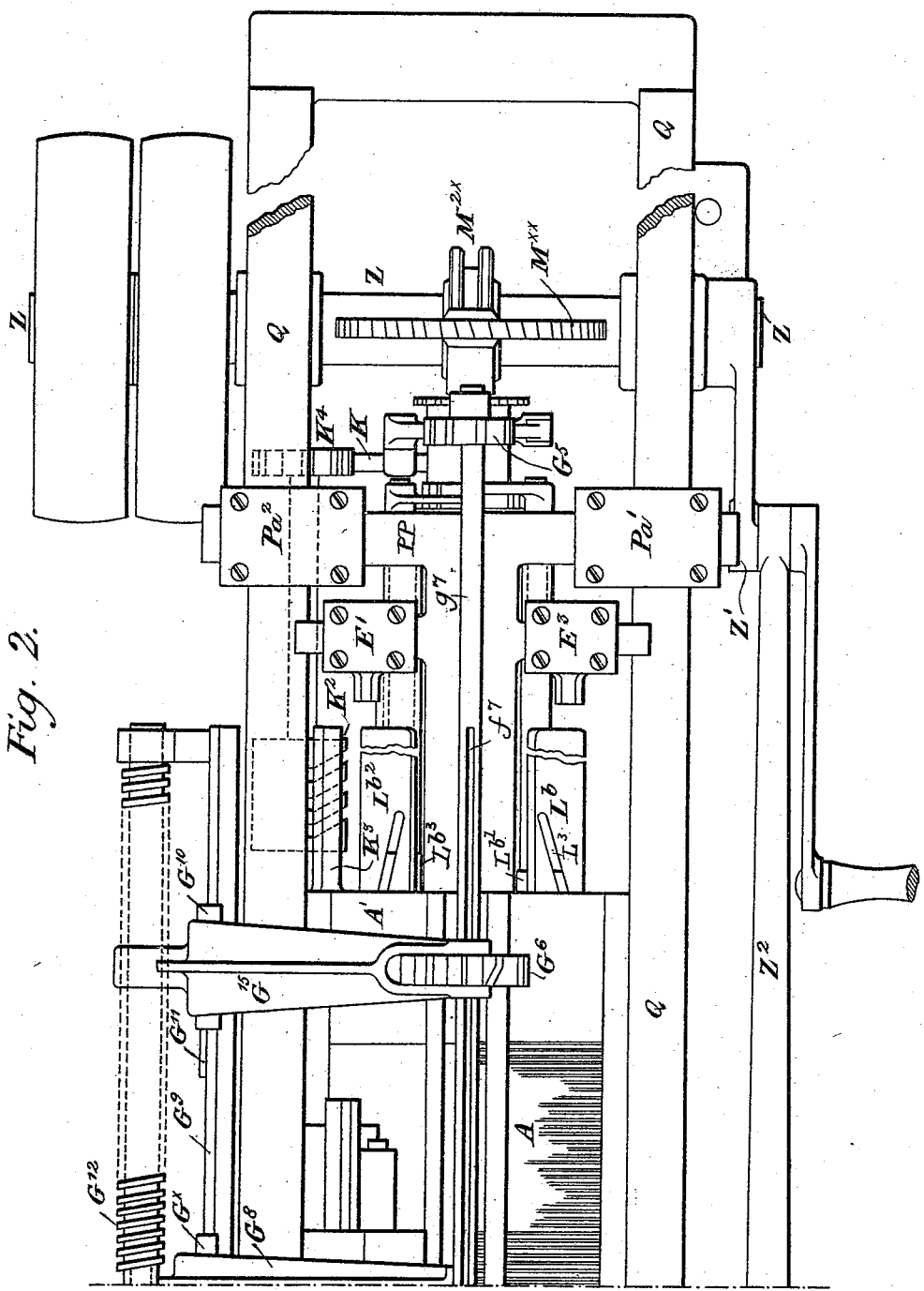

(No Model.) 15 Sheets—Sheet 5.

W. T. ROWLETT.
STRAIGHT KNITTING MACHINE.

No. 500,953. Patented July 4, 1893.

Witnesses.
Geo. J. Dixon
Baltus J. Long

Inventor.
William Lertius Rowlett,
By his Atty's.

Baldwin Davidson & Wight

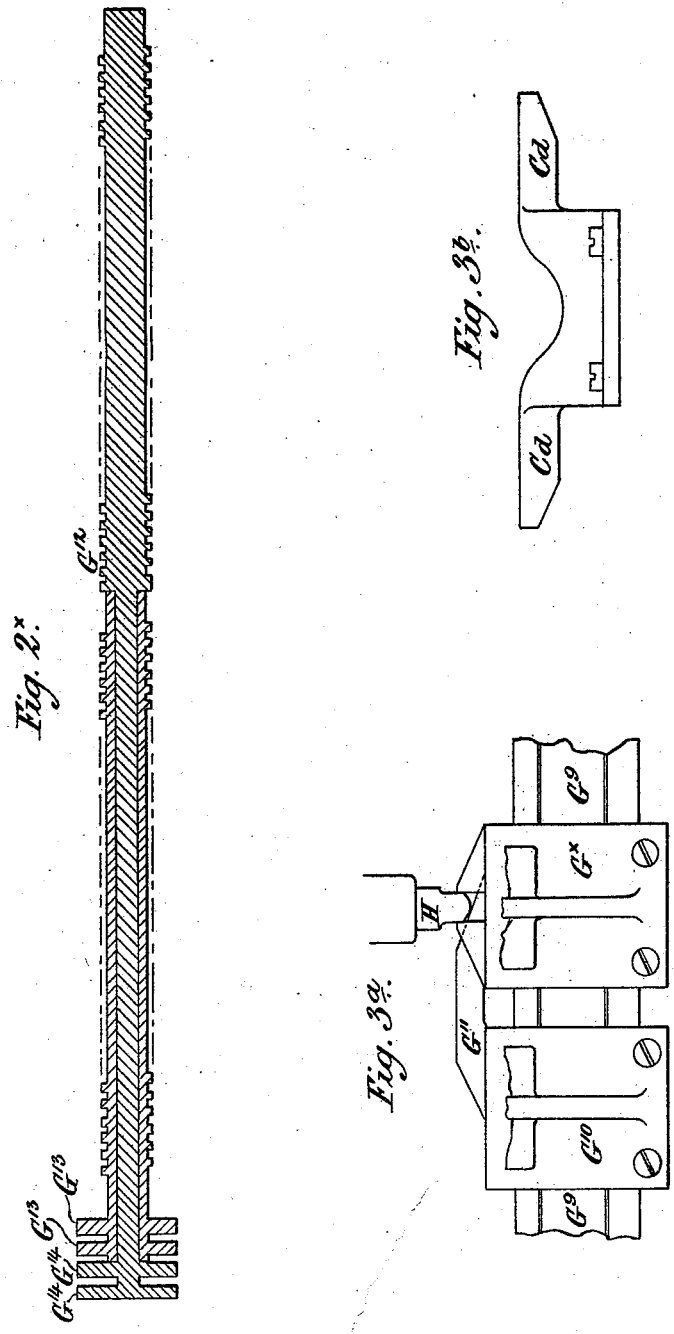

(No Model.) 15 Sheets—Sheet 7.
W. T. ROWLETT.
STRAIGHT KNITTING MACHINE.
No. 500,953. Patented July 4, 1893.
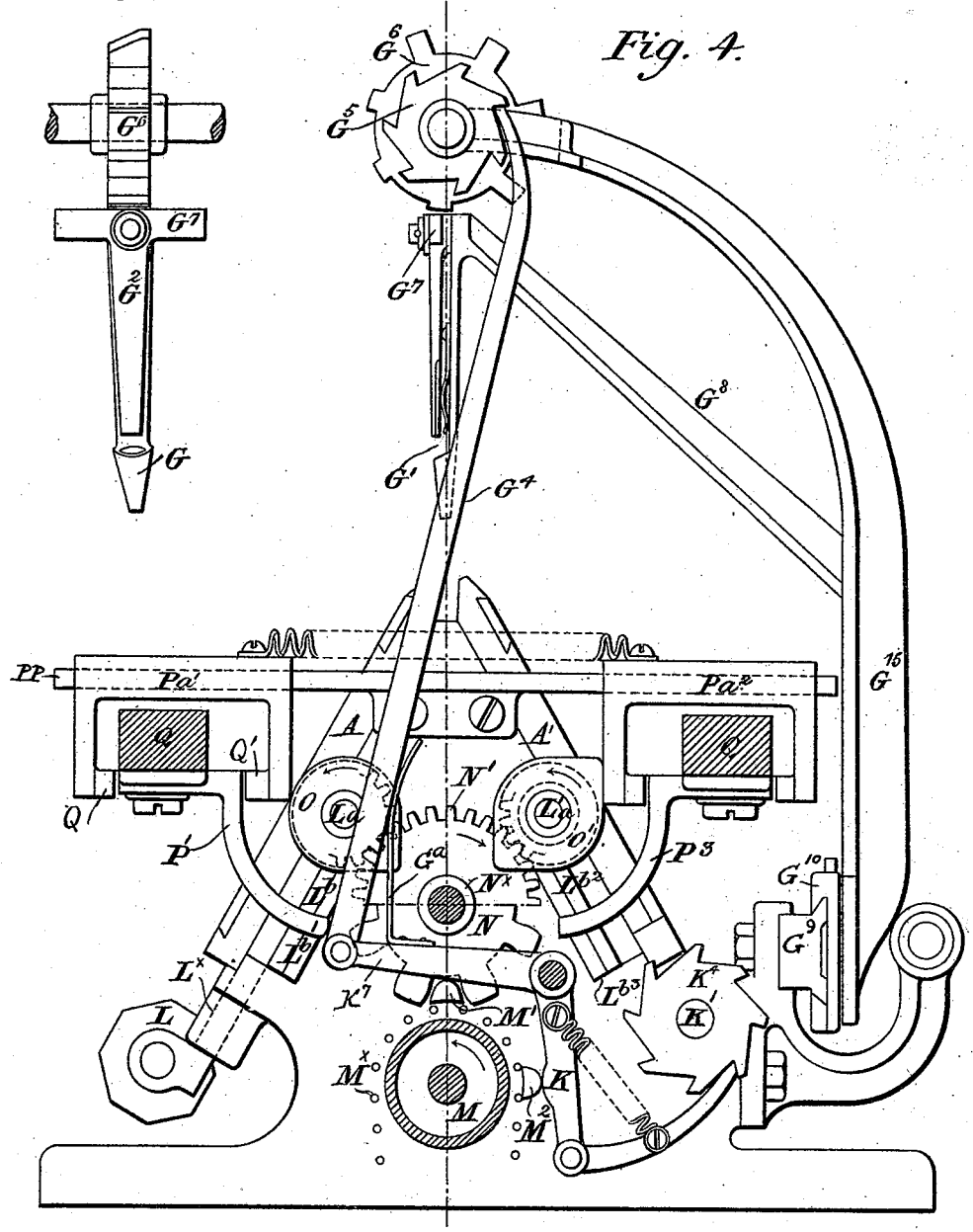
Witnesses.
George Dixon
Baltus De Long
Inventor.
William Tertius Rowlett
By his Atty's.
Baldwin Davidson & Wight.

(No Model.)  15 Sheets—Sheet 8.
W. T. ROWLETT.
STRAIGHT KNITTING MACHINE.
No. 500,953.  Patented July 4, 1893.
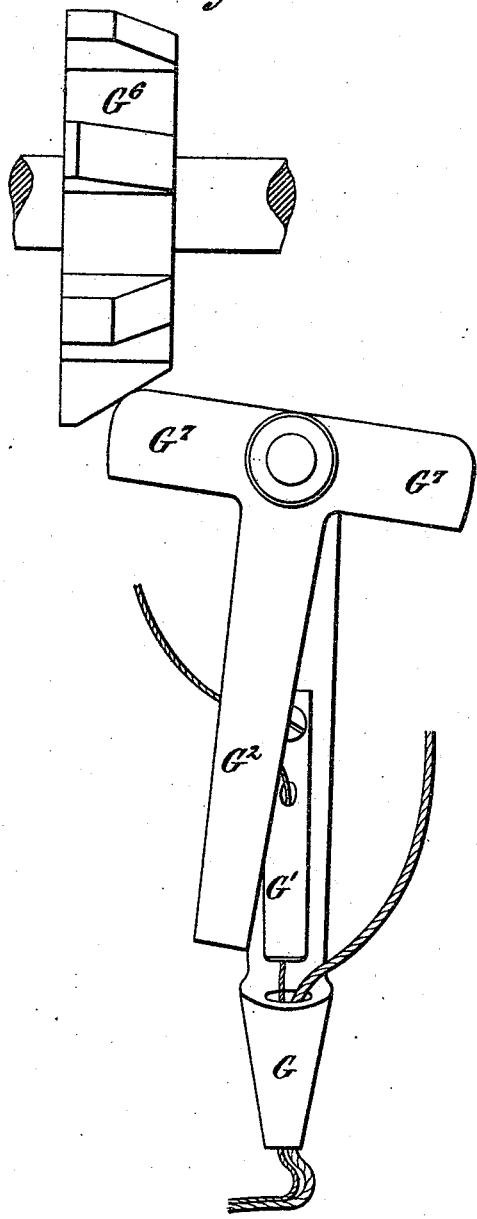
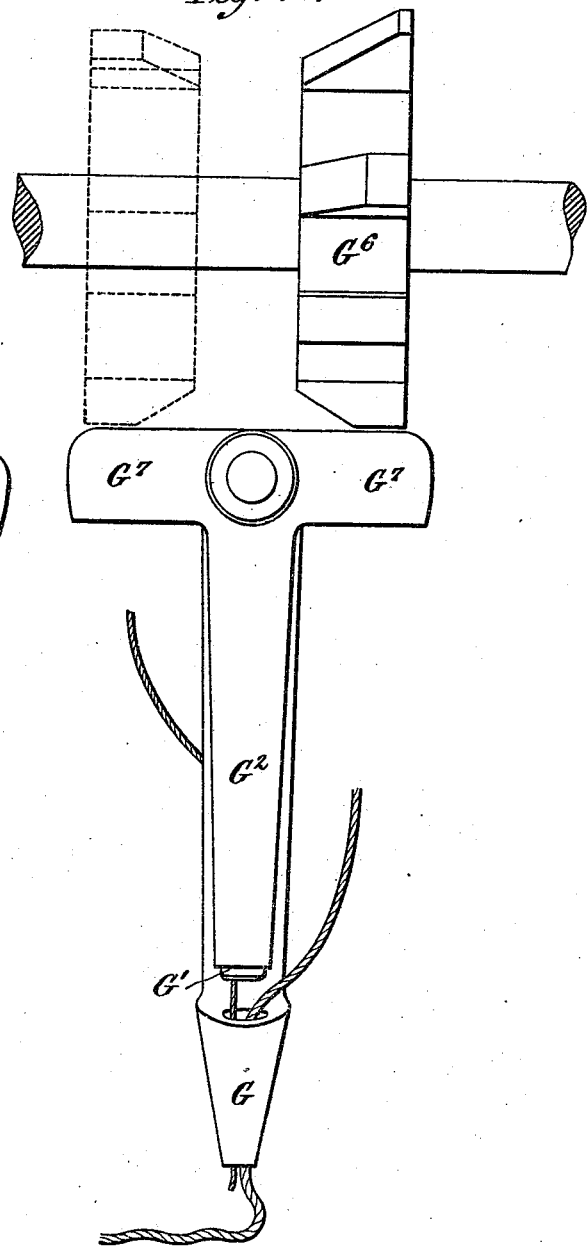

(No Model.)
W. T. ROWLETT.
STRAIGHT KNITTING MACHINE.
No. 500,953.
15 Sheets—Sheet 9.
Patented July 4, 1893.
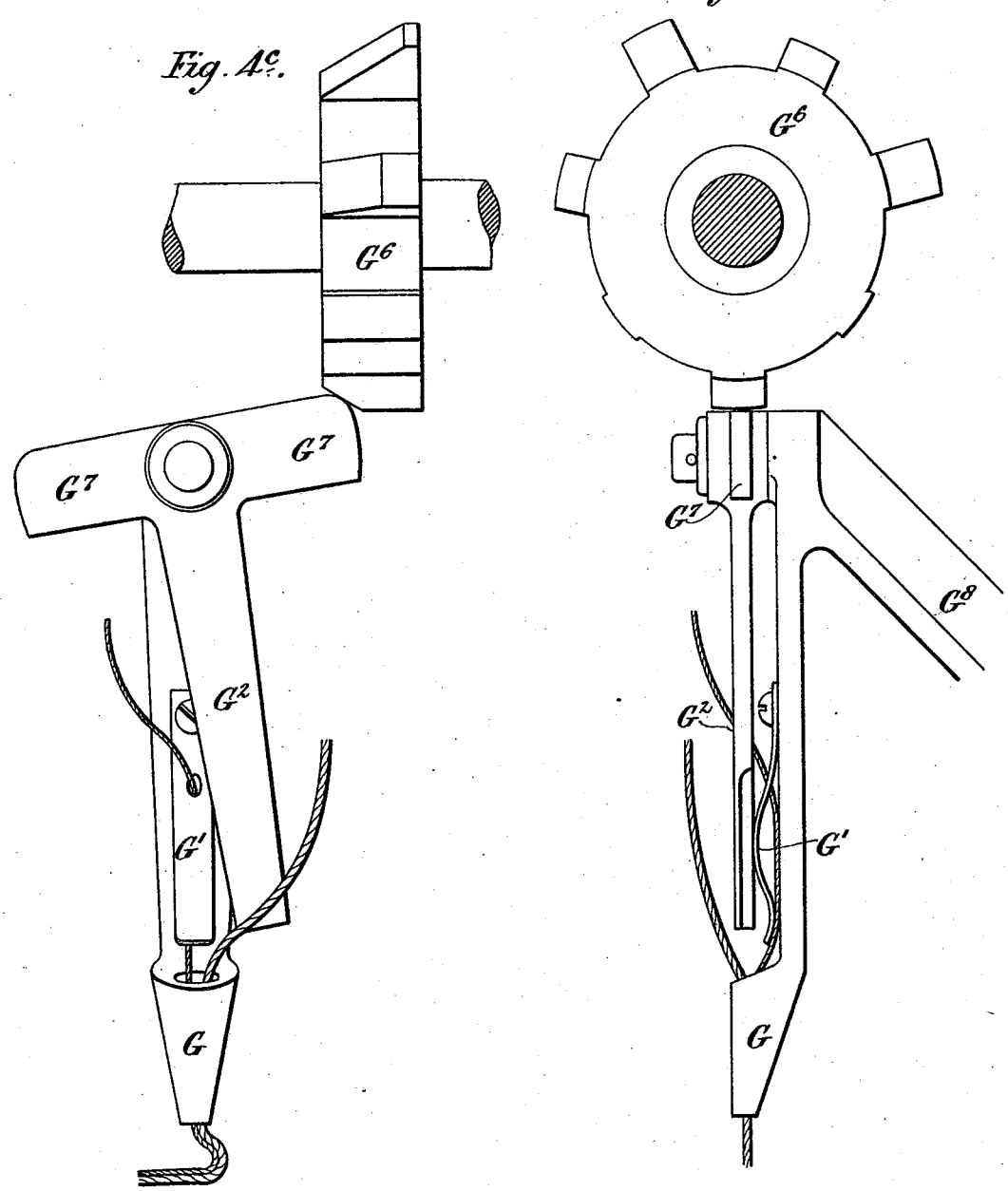
Witnesses.
B. W. Miller
Baltus D. Long.
Inventor.
William T. Rowlett
By his Attorneys
Baldwin, Davidson & Wight (No Model.)  W. T. ROWLETT.  15 Sheets—Sheet 10.
STRAIGHT KNITTING MACHINE.
No. 500,953.  Patented July 4, 1893.
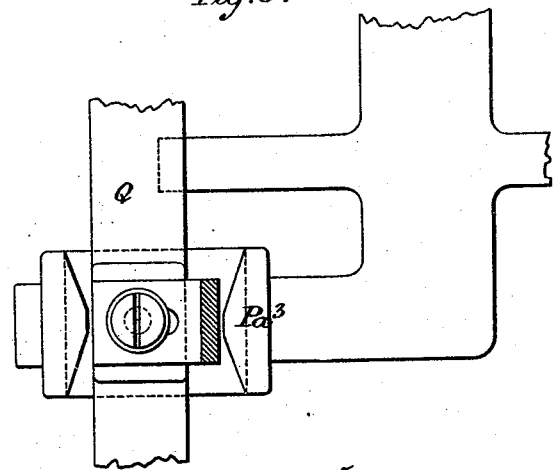
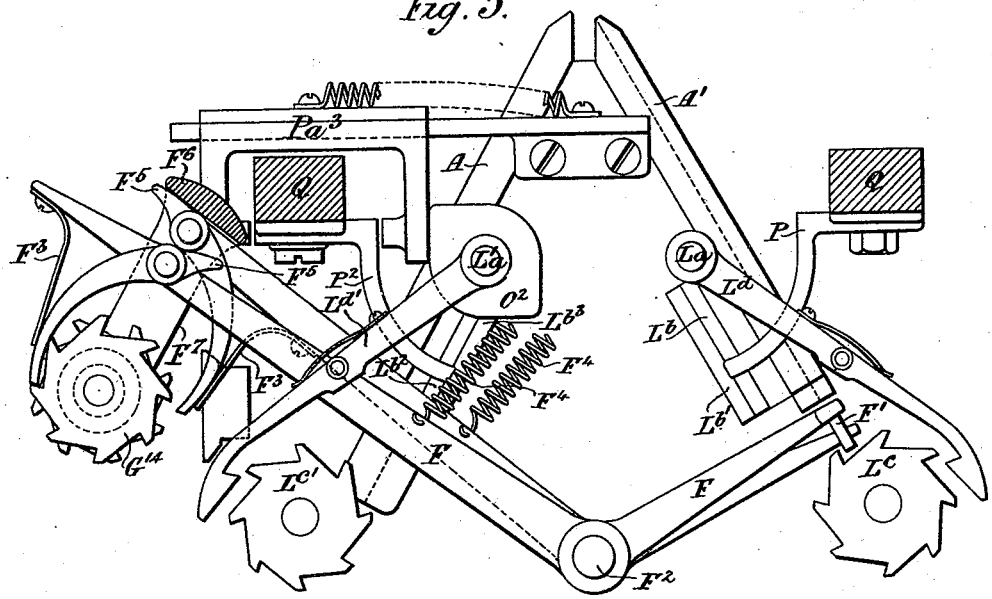
Witnesses.  Inventor.

(No Model.) 15 Sheets—Sheet 11.
W. T. ROWLETT.
STRAIGHT KNITTING MACHINE.
No. 500,953. Patented July 4, 1893.
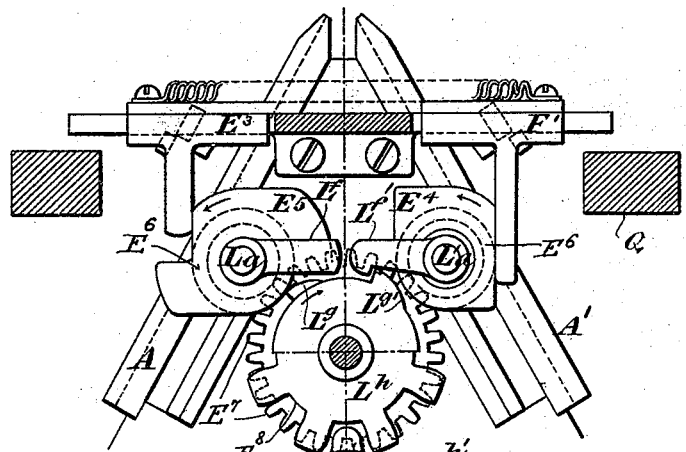
Fig. 6.
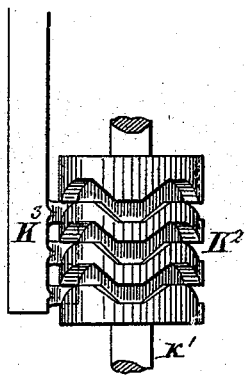
Fig. 7.
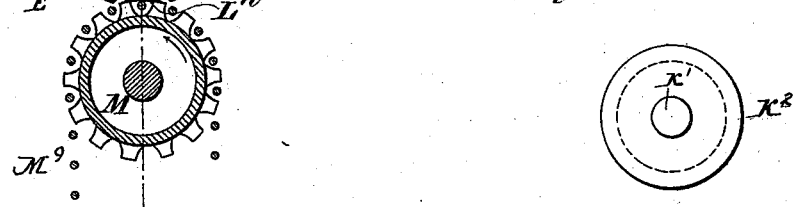
Fig. 8.
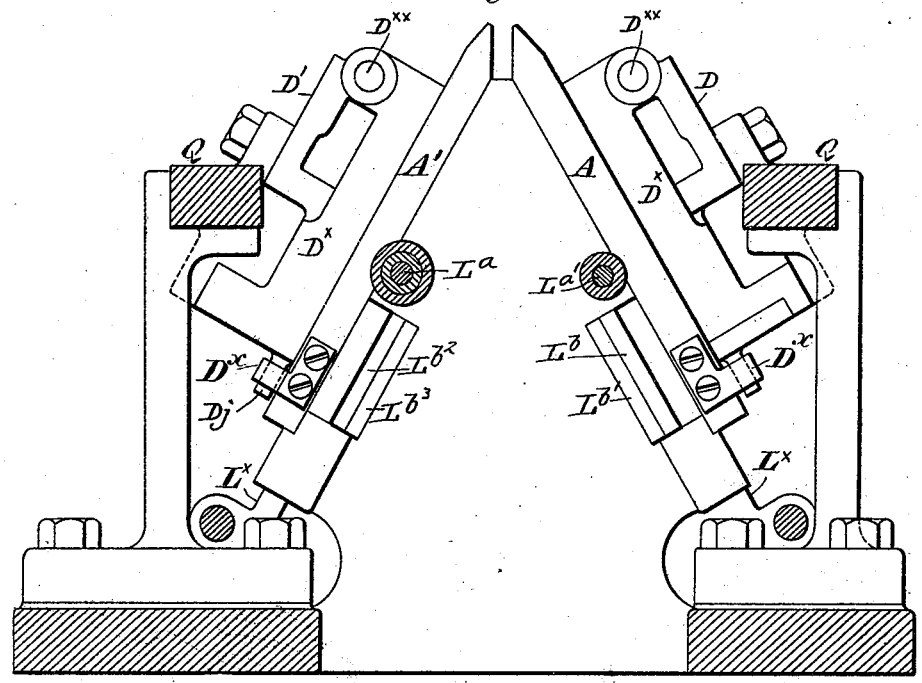

(No Model.) 15 Sheets—Sheet 12.
W. T. ROWLETT.
STRAIGHT KNITTING MACHINE.
No. 500,953. Patented July 4, 1893.
Fig. 9. Fig. 13. Fig. 14.
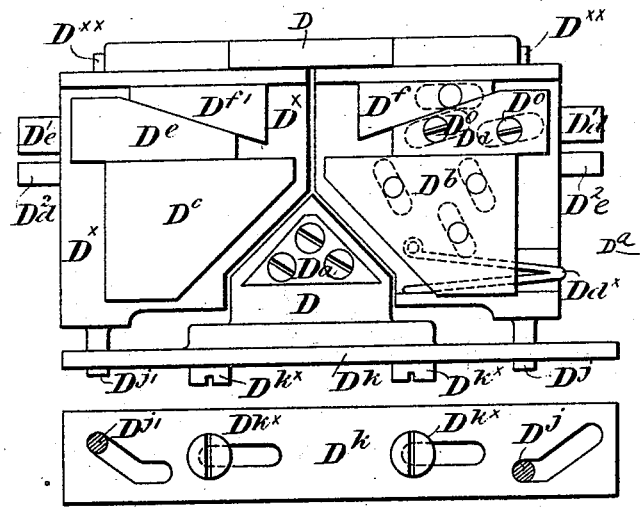
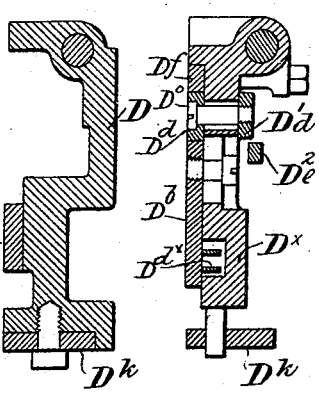
Fig. 10.
Fig. 11.
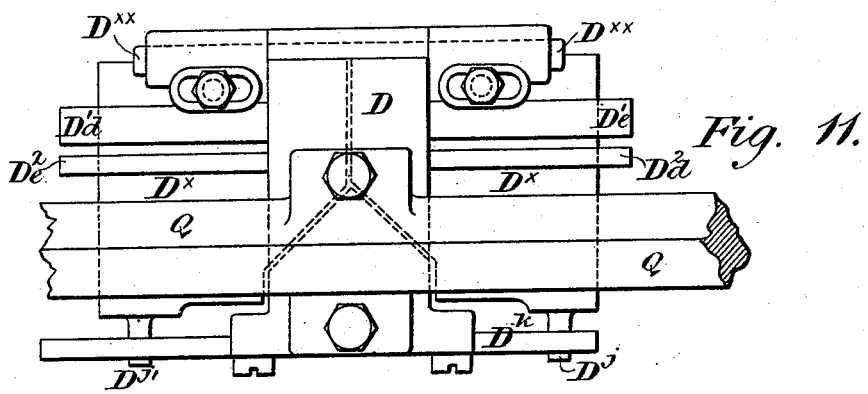
Fig. 12.
Witnesses.
Geo. L. Dixon
Baltus DeLong
Inventor.
William Tertius Rowlett.
By his Attys
Baldwin Davidson & Wight (No Model.)  15 Sheets—Sheet 13.

W. T. ROWLETT.
STRAIGHT KNITTING MACHINE.

No. 500,953. Patented July 4, 1893.

Witnesses.  
Geo. G. Dixon  
Baltus D. Lory

Inventor.  
William Titus Rowlett.  
By his Atty's.  
Baldwin Davidson & Wight.

(No Model.)  
15 Sheets—Sheet 14.
W. T. ROWLETT.
STRAIGHT KNITTING MACHINE.
No. 500,953. Patented July 4, 1893.
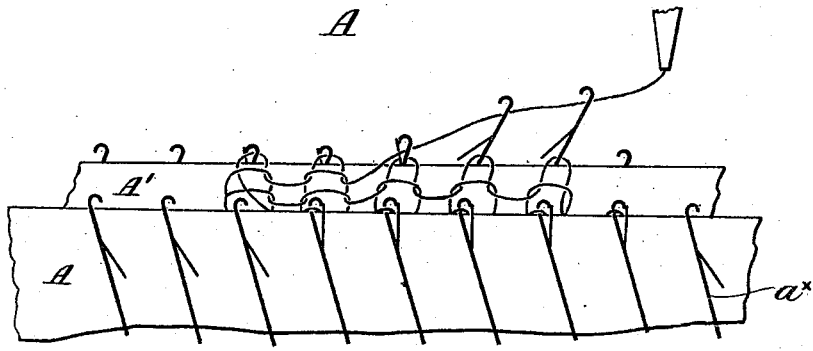
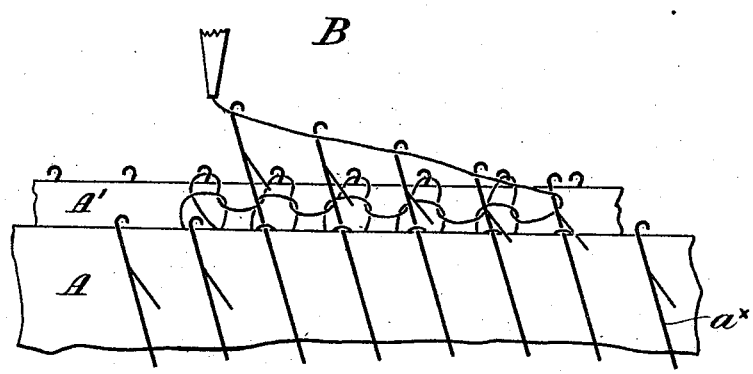
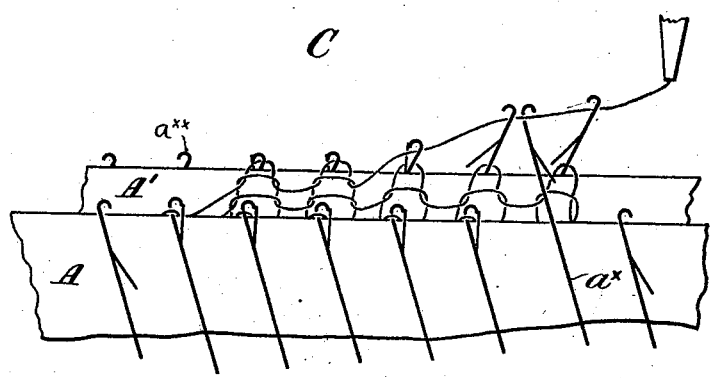
Witnesses
B. W. Miller
C. M. Brooke
Inventor
William T. Rowlett,
By his Attorney
Baldwin Davidson & Wight (No Model.) 15 Sheets—Sheet 15.
W. T. ROWLETT.
STRAIGHT KNITTING MACHINE.
No. 500,953. Patented July 4, 1893.
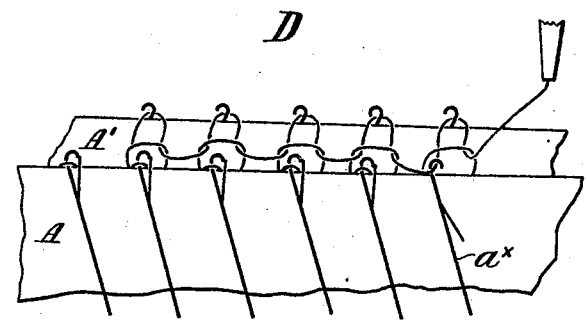
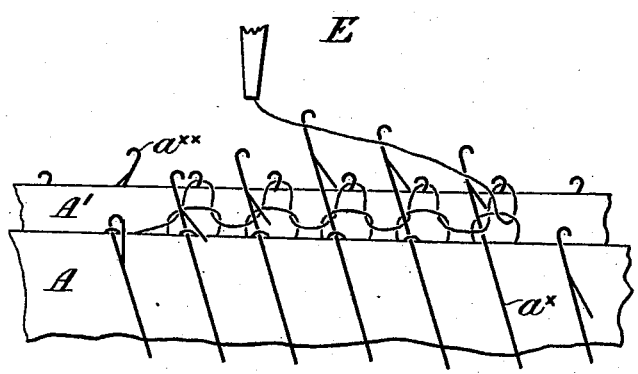
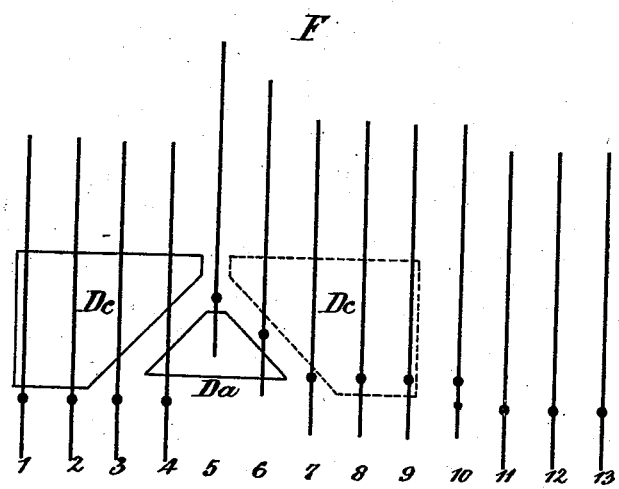
Witnesses.
B. W. Miller.
C. M. Brooks.
Inventor:
William T. Rowlett,
By his Attorneys
Baldwin Davidson & Wight

UNITED STATES PATENT OFFICE.

WILLIAM TERTIUS ROWLETT, OF LEICESTER, ENGLAND.

STRAIGHT-KNITTING MACHINE.

SPECIFICATION forming part of Letters Patent No. 500,953, dated July 4, 1893.

Application filed July 11, 1892. Serial No. 439,637. (No model.) Patented in England August 1, 1891, No. 13,126, and in France June 30, 1892, No. 222,711.

*To all whom it may concern:*

Be it known that I, WILLIAM TERTIUS ROWLETT, yarn merchant, a subject of the Queen of Great Britain, residing at 34 Newarke Street, Leicester, England, have invented certain new and useful Improvements in Straight-Knitting Machines, (for which I have received Letters Patent in Great Britain, No. 13,126, dated August 1, 1891, and in France, No. 222,711, dated June 30, 1892,) of which the following is a specification.

My invention relates to latch needle knitting machines formed with two parallel needle beds either straight or curved and adapted to produce tubular work as in the Lamb knitting machines. When making tubular work on such machines a course of work is first made along the needles of one bed and then with the same thread a course of work is produced along the needles of the other and so on, as is well understood. Machines of this kind have also before been constructed in such a manner that the down-throw cams used for lowering the needles bring the needles too low for them to be again raised by the up-throw cam, unless they have been previously raised a distance by the action of Jacquard cards brought against them. No fashionings could be produced automatically on such machines without small holes being left in the work wherever the widenings were made.

The main object of my invention is so to construct such machines that fashioned work may be automatically produced upon them without holes being left in the work at the points where the widenings are made. Whenever a widening is to be made, a new needle is brought up into working position at the end of one row or the other of needles previously in work. In order that a hole may not be produced in the work by the bringing in of this needle, I, according to my invention, cause the last sinker loop of the work on the opposite row of needles to be stretched or placed automatically on this needle before any work is made upon it. I do this by making one of the needle beds capable of being shifted endwise to and fro a short distance and by then causing the needle which is to be brought into work to come forward and take the loop at the proper time, as illustrated by the diagrams A, B, C. The action is illustrated in the diagram perspective views A, B, C, D, E, as seen from the front of the machine. Diagrams A and B show how tubular work is made in the ordinary way, a course of work being first produced upon one bed of needles A, and then with the same thread a course of work on the other bed of needles A', and so on. Diagram A, shows work being produced upon a few of the back needles and B, shows work being produced on a few of the front needles. Diagrams C, D and E, show how a widening is made without allowing any hole to be formed in the work. Diagram C, shows the back bed A' shogged to the right and the needle $a^x$, which is to be brought into work, raised between the last two needles of the bed A', which have work upon them. Diagram D shows how the needle $a^x$ has thus been made to take the sinker loop between these last two needles. Diagram E shows the next course of work upon the front bed just being commenced. Diagram F shows how the cams raise and subsequently lower only such needles as have been previously raised a short distance by the action of the jacquard. The dots represent projections on the needle stems which the cams act upon. $Da$ is the up-throw cam and $Dc$ a down-throw cam. The needles 5 to 10 are shown to have been raised a short distance by the jacquard so that when the cams $Da$ $Dc$ travel to the right, they get farther raised by the up-throw cam $Da$ and then subsequently lowered by the down-throw cam $Dc$ to such a position that they cannot subsequently be acted on by the up-throw cam when it moves in the opposite direction unless they are first again slightly raised by the action of the jacquard.

Figure 3:
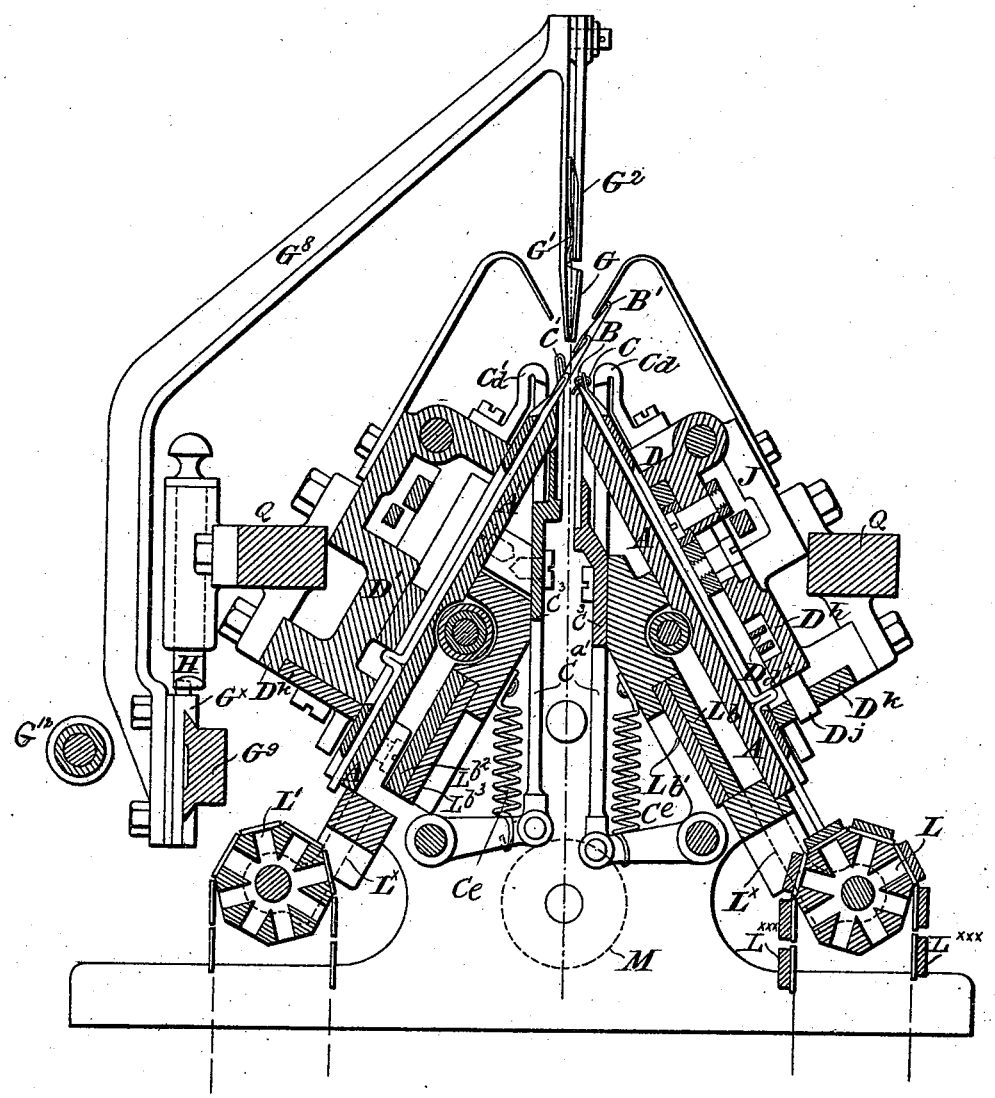
Figure 15:
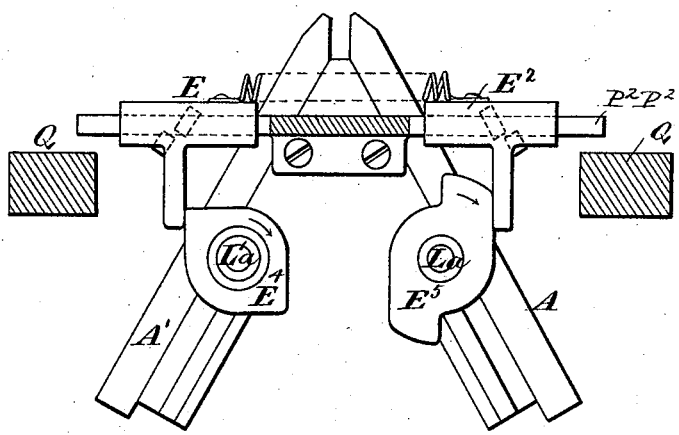
Figure 16:
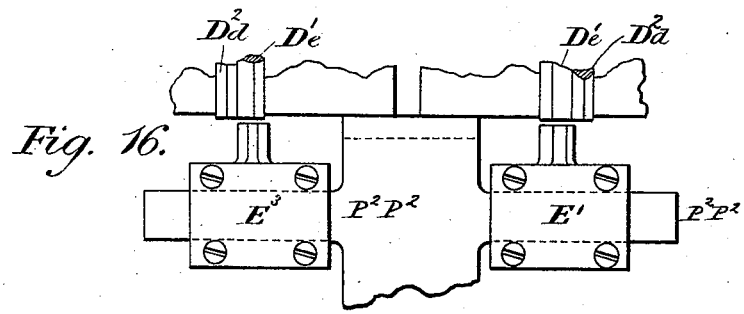

In Figures 1 to 16 I have shown my invention applied to what is known as a Lamb machine which has two straight needle beds and is so constructed that either a piece of ribbed work or a tubular fabric of plain work can be produced upon it. Fig. 1 the right and left hand halves of which are shown on Sheets 1 and 2 is a side elevation partly in section of the machine. Fig. $1^x$ is an edge view of cam $M^{2x}$. Fig. 2 the two halves of which are shown on Sheets 3 and 4 is a plan view. Fig. 2× is a longitudinal section of the screws G¹², and the spindles which carry them. Fig. 3 is a transverse section on a larger scale of the needle beds and the cams and Jacquard barrels which operate the needle. Fig. 3ª is a side elevation of part of bar G⁹, and bolt H, as well as the slide G× and incline G″, and Fig. 3ᵇ is a side view of the inclines Cd. Fig. 4 is a right hand end view. Fig. 4× is a front elevation of some of the parts shown in Fig. 4. Figs. 4ª, 4ᵇ, 4ᶜ and 4ᵈ show the way in which the splicing thread is broken or allowed to pass into the work with the other thread. Fig. 5 is a transverse section showing the ratchet wheels and pawls by which the Jacquard barrels are turned and the ratchet wheel and pawls used for turning the screw shaft by which the position of the stops used for limiting the throw of the thread carrier is controlled. Fig. 5× is an under side view partly in section of a portion of what is shown in Fig. 5. Fig. 6 is a transverse section showing the parts used for putting the pawls which turn the Jacquard barrels in or out of action. Fig. 7 shows a top view and an end view of the cam used for shogging the movable needle bed to and fro. Fig. 8 is a cross section of the machine showing the form of the frame and the supports for the reciprocating frame by which the cam boxes are carried. Fig. 9 is an under side view of one of the sets of cams. Fig. 10 is a face view of one of the slides by which the downthrow cams are put in and out of action. Fig. 11 is a plan view of the cams and of a portion of the frame Q by which they are carried. Fig. 12 is a plan view of the two downthrow cams and of the two bars by which these cams are raised and lowered to produce slack and tight courses. Figs. 13 and 14 are vertical sections of what is shown in Fig. 9. Fig. 15 is a transverse section showing control cams and sliding stops at the left hand end of machine for controlling the stiffening of the work. Fig. 16 is a plan of part of the same.

In Figs. 1 to 16, Z is the main driving shaft which by crank pin Z′ connecting rod Z² and lever Z³ whose fulcrum pin can rise and fall gives a to and fro horizontal motion to a horizontal frame Q.

A is the front needle bed and A′ the back needle bed which is capable of being shogged endwise.

B are the needles of the front bed and B′ the needles of the back bed.

C are the web holders of the front bed and C′ the web holders of the back bed.

D is a plate carrying the cams of the front bed and D′ a plate carrying the cams of the back bed. These are bolted to short arms that stand out from the opposite side bars of the frame Q.

All variations of the letter D refer to various working parts of the cams.

G is the thread carrier carried by a slide G× which can be slid to and fro along a fixed bar G⁹.

G′ is a spring carrying a splicing thread.

G² is a lever for cutting off and releasing the splicing thread.

H is a spring actuated bolt carried by the frame Q. It is pressed downward by a spring so that its lower end may engage with projections which stand up from the slide G× and carry the slide along with it until the bolt is raised and put out of action by inclines G″ (see Figs. 2 and 3ª).

K K′ K² K³ are parts for shogging the back needle bed A′.

L is the Jacquard barrel working with the front bed and L′ the barrel working with the back bed. M denotes barrels with pattern chains for controlling the working of all the parts.

Various views of the cams used for raising and lowering the needles are shown at Figs. 9 to 14.

Da is the upthrow cam secured rigidly to the plate D which as before stated and as is shown at Figs. 3 and 11 is bolted to the frame Q.

D× D× are plates hinged by the joint pin D×× to the plate D one on either side of it. Each plate carries a downthrow cam one marked Db and the other marked Dc.

Dk is a bar which by screws Dk× is held to the end of the plate D the screws passing through slots so that the bar can be slid a distance endwise to and fro. In it are two slots inclined in opposite directions. Into one enters a pin Dj which projects out from one plate D× and into the other enters a pin Dj′ which projects out from the other plate. In this way when the bar is moved endwise one plate is raised and the downthrow cam carried by it put out of action while the other plate is lowered and the downthrow cam carried by it brought into action. This endwise to and fro motion is given to the bar Dk by fixed stops Dx (see Fig. 8 Sheet 8) against which the ends of the bar strike at the end of each movement of the main slide Q. In this way the downthrow or stitch cam which was in action when the slide Q was moving in one direction is put out of action before the slide commences to move in the opposite and the other downthrow cam is brought into acting position. As will be seen by Fig. 9 the downthrow cams extend downward some distance beyond the bottom of the upthrow cam so that when the needles have been lowered by either of the downthrow cams they cannot be caught by the upthrow cam without being previously raised a distance.

The raising of the needles into a position for them to be caught by the upthrow cams is effected by Jacquard cards supported on Jacquard barrels L, L′. If when a card is brought against the needles there are holes in it opposite to the ends of any of the needles then those needles remain unraised by the card and are not caught by the upthrow cam but the others are raised to a sufficient height for the upthrow cam to act upon and further raise them.

The axes of the Jacquard barrels are supported by bars $L^x$ which can be slid up and down in guide grooves formed in the fixed frame at the back of the needle beds. From the back of the bar projects a pin $L^{xx}$. See right hand half of Fig. 1. This enters slots $L^3$ cut in two of the plates $Lb$, $Lb'$, $Lb^2$, and $Lb^3$ there being two of these plates situated at the back of each needle bed. When one of the two plates is struck endwise in one direction the Jacquard barrel will be drawn upward toward the lower ends of the needle stems and when the plate moves in the opposite direction the barrel is moved away from them. Normally the Jacquard barrels are away from the needles and the portions of the slots in the bars $Lb$, $Lb'$, and $Lb^2$ and $Lb^3$ which are parallel with the bars $L^x$ are then one over the other and the barrel can be raised to the needles by either bar being struck endwise.

To strike the bars endwise and raise and lower the Jacquard barrels, stops P P' $P^2$ $P^3$ on the sliding frame Q are used. When by the movement of the sliding frame Q, one of the stops is brought against one of the bars, the bar is moved endwise and the Jacquard barrel is raised. When the frame Q, is moved in the opposite direction, the Jacquard barrel is drawn back from the needles by its own weight and carries the bar back to its former position. One stop P is fixed to the frame Q as it is always required to be in action because when P moves toward the end of the bar $Lb'$, the next course of work to be made is always upon the front needles whatever part of a stocking is being made, whether the toe or heel or leg; the front Jacquard barrel, therefore must at this time always be raised against the front needles; the others can be slid inward or outward a short distance in guides on the frame so that they may either come against the ends of the bars $Lb$, $Lb^2$, or $Lb^3$ or not come against them.

If tubular work is being made and the frame Q, is being moved in a direction to bring P against the bar $Lb'$, the front Jacquard barrel is raised and the next course is made along the front needles; during this next course $P^3$ comes against $Lb^2$, and lifts the back Jacquard barrel and the next course is made along the back needles; the other stops P' $P^2$ are kept out of action. When a widening is to be made, say when a course of work is about to be made on the front needles, not only is the front Jacquard barrel brought up to its needles, as above explained, but also the back Jacquard barrel by reason of one or other of the bars $Lb^2$, $Lb^3$, being then struck by one or other of the stops $P^2$, $P^3$. The Jacquard card then brought up to the back needles by the back barrel is so pierced that only the new needle which is to be brought into work is raised into position to be caught by the upthrow cam and consequently at the end of the course it is only this needle of the back needle bed which takes the thread laid on to the front needles. When work is to be made on the front bed of needles, only, as for example when making the heel, both of the stops $P^2$, $P^3$ are kept out of action, so that the back Jacquard barrel remains down and out of action.

The movement of the stops P' $P^2$ $P^3$ is controlled by inclines on three slides $Pa'$ $Pa^2$ $Pa^3$ which can be slid transversely of the machine along horizontal arms P P fixed to the frame of the machine. They can be slid upward by the action of cams O O' $O^2$ and are drawn inward by the action of springs as shown in Figs. 4 and 5.

It will be seen that the cam O differs in shape from the cams O' $O^2$. This is so that when the two latter have thrown the stops $Pa^2$, $Pa^3$, out of work P and P' remain in position so as to actuate the jacquard of the front bed every time when making the heel. In this way each Jacquard barrel will be drawn up to the needles at each alternate endwise movement of the frame Q, while when making the heel the jacquard of the front bed will be drawn up to the needles at every movement. Each time that the Jacquard barrels recede from the needles they are turned a distance by pawls $Ld$ $Ld'$ acting on ratchet wheels $Lc$ $Lc'$ fixed on the axes of the barrels. If however the pawls be held up out of the way of the ratchet wheels then the barrels remain unturned.

In making a straight tube continuously of the same width as for the straight portions of a stocking it is obvious that the same cards on the jacquard may operate every time so as to bring the same number of needles into action. This is done by causing the pawls to be lifted out of action. The pawls are on the ends of spindles $La$ $La'$ passing through the spindles carrying the cams which control the stiffening of the work. At the other ends of the spindles are two arms $Lf$ $Lf'$ which are raised by the action of two cams $Lg$ $Lg'$ (see Fig. 6) turned by a large cog wheel $Lh$ half of which is cut away to allow of the cams being shown. The cog wheel has a partial turn given to it at the proper time by studs $Lh'$ on a pattern chain $M^9$ carried by the barrel M. The pawls are put out of work by being raised by the action of springs or weights and when they are to be brought into work they are held down by the action of cams $Lg$, $Lg'$.

The cams O O' $O^2$ have a quarter turn given to them at the proper times by the action of pins on a pattern chain in the following manner: On the shafts which carry the cams are pinions $O^5$ which gear with a toothed wheel N' on a sleeve $N^x$ on which is also a wheel N having larger teeth. In Fig. 4 half this wheel is cut away to show the toothed wheel N' behind it. $M^x$ is an endless pattern chain passing around a barrel M to which a step by step revolving motion is given. M' is a stud on the pattern chain. When the chain is moved and a stud M' comes against one of the teeth of the wheel N it turns this wheel a distance of one tooth. The step by step revolving motion is given to the barrel M by a worm wheel $M^{xx}$ on its axis having gearing with it a worm $M^{2x}$ on the main driving shaft Z of the machine. The greater part of the worm thread is at right angles to the axis and gives no movement to the worm wheel but at two opposite points is sharply inclined to the axis as shown at Fig. $1^x$ so as when these portions engage with the worm wheel they give to it a quick partial turn.

In making the two first rib courses at the toe of the stocking and also on the side wherever a new needle is brought into work it is desirable to make the fabric stiffer. Provision is therefore made for automatically setting the downthrow or stitch cams higher or lower according to the length of loop that is to be drawn down by the needles. This is done in the following manner: The cam D$b$ is pressed upward by a spring D$d^x$ against a wedge D$d$ which itself rests against a fixed corresponding wedge D$f$. By moving the wedge D$d$ toward the wedge D$f$ the cam D$b$ is set lower while by drawing it back it is allowed to be raised by the spring D$d^x$.

To move the wedge D$d$ to and fro it is connected by pins D° with a bar marked at its two ends D'$d$, D$^2d$ at the back of the plate D$^x$ so that when the bar D'$d$, D$^2d$, is moved endwise the wedge D$d$ goes with it. Slots in plate allow the pins D° to move freely. The wedge D$e$ is similarly secured to a bar marked D'$e$, D$^2e$ and the above arrangement is duplicated for the cam D$c$ on the left hand side of Fig. 9. The spring and some of the other details are not shown on this side of the figure.

At each end of the machine are stops E E' E$^2$ E$^3$ see Figs. 2, 15 and 16 having projecting pieces. A plan view of E' E$^3$ is shown in Fig. 16. When the main slide reaches the end of its throw say from left to right the projecting pieces on the stops E$^3$ and E' touch for example D$^2d$ and D'$d$ respectively and change them from their previous positions if they were not already in the positions into which the stops would move them.

The stops are carried by slides which can be slid to and fro transversely of the machine along horizontal arms P$^2$ P$^2$ fixed to the frame of the machine. They can be slid outward by the action of cams E$^4$ E$^5$ and are drawn inward by the action of springs in a similar manner to the slides P$a'$, P$a^2$, P$a^3$. The cams also have motion given to them from a shaft which has a step by step revolving motion transmitted to it at the proper time in the same way as described with respect to the cams O O. The cams E$^4$ E$^5$ are on hollow spindles which surround the spindles L$a$, L$a'$. They are turned at the proper time by pinions E$^6$ (see right-hand half of Fig. 1), gearing into a toothed wheel E$^7$, on the axis of which is a wheel E$^8$, having larger teeth. On the pattern chain M$^x$ are studs E$^9$. When by the movement of the endless chain one of these studs E$^9$ engages with the teeth of the wheel E$^8$ and gives a partial turn to this wheel a quarter turn is given to the cams E$^4$, E$^5$, and the down-throw cams are set to make either tighter or slacker courses according to the previous position of these cams.

In order to keep the work down while the needles are being pushed up by the jacquard, I have a row of hooks C and C' (see Fig. 3) attached to each knocking over bar C$^3$. When the course is being made, these hooks are in the position shown at C', so that the sinker loops lie over their stems. Before or just as the Jacquard barrels raise the needles the hooks C, C', are lowered so as to hold the loops down while the needles are raised. They are lowered by inclines C$d$ or C$d'$ (see Figs. 3 and 3$^b$), fixed on the cam plates D, D'. Toward the end of each course the inclines come above the ends of the rods C$a'$, which stand up from the bars by which the hooks C C' are carried and thereby lower and hold down the hooks. Afterward when the cam plates D, D' are made to travel back in the opposite direction, the inclines are moved away from above the rods C$a'$, and the hooks C, C' are drawn upward by the action of springs C$e$, (see Fig. 3). In the drawings, Fig. 3 both of the rods C$a'$ are shown as being held down by the inclines C$d$, C$d'$, but one of the knocking over hooks is left up to illustrate its two positions.

The thread carrier G is carried by the arm G$^8$ from a slide G$^x$ which can be slidden along the fixed bar G$^9$ by the bolt H which is held down by a spring. On the bar G$^9$ are also two slides G$^{10}$ each carrying an incline G$^{11}$. The slides can be moved nearer to or farther away from one another by screws G$^{12}$ on concentric axes see Fig. 2$^x$. One screw acts on one slide and the other screw on the other. One axis has upon it two ratchet wheels G$^{13}$ the teeth of which are in opposite directions. The other axis has also upon it two similar ratchet wheels G$^{14}$. The pawls for driving these wheels are carried by four levers F which turn on a fulcrum at F$^2$; the other ends of these levers have pins F' projecting from them which are acted on or left at rest by the Jacquard cards whenever the jacquard is moved up to the needles.

In Fig. 5, the Jacquard barrels are shown in their raised position; one lever F, (the front one,) is shown to have been acted upon by the jacquard, the other, (the back one) remaining out of action, there being a hole in the Jacquard card opposite to its pin F'. The pawls are pressed toward the ratchet wheels by springs F$^3$. The levers are drawn upward by coiled springs F$^4$ attached to a portion of the frame-work of the machine. Each pawl is formed with a tail piece F$^5$. When the Jacquard barrel descends the levers F previously acted upon by it are drawn upward by their coiled springs F$^4$, and the tail pieces F$^5$ of their pawls strike against a fixed bar F⁶, and so disengage the pawls from the wheels. The bar F⁶ is an extension from an arm F⁷ that stands up from the portion of the framing that carries the bearings for the axes of the ratchet wheels. The splicing thread is carried on the front of the thread carrier, and passing down through G, with the foundation thread, is carried by it to the needles. It passes first through a hole in a spring G′, see Figs. 4, 4ª, 4ᵇ, 4ᶜ, and 4ᵈ and when free passes in continually with the main thread, but by turning the T shaped piece G² so as to press upon the spring, the thread is broken, and when desired to run it in again, this piece G², is pushed aside so as to free it. This enables the splicing thread to be either run in continually or to be broken off at the end of the course on one bed.

To actuate the T-shaped piece G², I have a series of stops on the circumference of two wheels, carried on two arms G¹⁵, which stand up from the slides G¹⁰ which carry the inclines G¹¹ for regulating the throw of the thread carrier. When G² is vertical, the splicing thread is broken. When G² is inclined in either direction, the thread is free and passes into work with the other thread. If the splicing thread is not to be inserted either when a course is being made from right to left or vice versa, then both stop wheels G⁶ are in the position shown at Fig. 4ᵇ and G² remains in a vertical position. If a splicing thread is to be inserted in courses made from left to right, then the left-hand stop wheel G⁶ is turned into the position shown in Fig. 4ª, so that the left hand end of G⁷ comes against one of the longer projections of G⁶. If, on the other hand, a splicing thread is to be inserted in courses made from right to left, the right-hand end of G⁷ comes against one of the longer projections of the right hand wheel G⁶. The wheels G⁶ are turned into the positions required for making these changes by a ratchet wheel G⁵ on the axis which carries them, it being acted on by a pawl G⁴, which at its lower end is jointed to an arm K⁷ which can turn freely around the axis of the arm K, while its upper end is by a spring Gª, (shown in Fig. 4) held against the ratchet wheel G⁵. When the arm is acted upon by a pin M², on the chain M⁹, the pawl is raised and gives a partial turn to the ratchet wheel. When the pin passes from below the arm, the arm and pawl descend by their own weight. A feather projecting inward from the boss of each wheel G⁶ enters a groove f⁷ (see Fig. 2) formed along the shaft that carries them, so that these wheels may be moved toward or away from one another and yet always be turned by the shaft.

For shogging the movable needle bed, I fix to the right hand end of it a short rack K³ the teeth of which fit into zigzag cam grooves K² formed around a cylinder to which a step by step revolving motion is given at the proper times. When the cam revolves, it moves the bed first to the left, then has a straight place and stands still. Afterward it moves it back again, and stands still again. The cam is shown at K², and the motion is given by the lever K, acting upon a ratchet K⁴, on the axis K′ of the cam K², and actuated by a stud M² on the chain M⁹.

In order fully to show the working of the machine, I will proceed to describe the mode of making a fashioned stocking by widening, and commencing at the toe. I first make two ribbed courses, of any desired width, by lifting the required number of needles up at both sides through the jacquards L and L′. They are then raised sufficiently high to catch the thread from the thread carrier G, and brought down again by the stitch cam Db and the corresponding one on the opposite bed. After these two ribbed courses, I make one plain course on each side, which is done by the jacquard acting alternately on each side so making a tube. I then shog the back needle bed the distance of two needles to one side say to the right by means of K K′, K², K³, so as to leave two needles more at one end of each bed than at the corresponding end of the other, so that if making ribbed work, there would be a needle wanting, say, at the right hand end of the front bed, and at the left hand end of the back bed. I now work a course from left to right on the back bed, and on the front bed bring up only one needle $a^x$ to fill up the vacant space. This needle having no loop on it, lies between the two outer needles of the opposite bed, in such a manner, that the yarn between them, generally known as the sinker loop, is laid over the empty needle. See Diagrams C, D, and E. I next make a course on the front bed when the thread being caught by the front row of needles, is worked into the sinker loop lying round the new needle, thus filling up what would have otherwise been a hole, and widening the fabric by one needle. During the making of this course, a single needle $a^{xx}$ has been raised at the left hand end of the back bed so as to bring another needle into action in the way already described. A plain course is now made on both beds, and the back bed then shogged two needles to the left so as to repeat the operation of widening. This is continued as long as necessary to attain the width desired for the toe, after which a number of plain courses are made until the gusset is reached. The necessary number of widenings are then made in a similar manner to that above described and afterward the heel is made by working backward and forward on the front bed only and on a varying number of needles, so as to produce what is known as the Griswold heel. Then follow a number of plain courses on each side to make a plain tube until the calf when the work is again widened and afterward a plain tube of full width, completes the stocking. In this way I obtain a properly shaped foot narrower than the leg—and the leg also properly fashioned. By the splicing mechanism hereinbefore described I can also put in a full spliced toe and heel and spliced sole, splicing half round for some distance above the heel, and splicing half round at the knee.

In making the heel, when a needle has been withdrawn, I raise it again the next course, sufficiently high to catch the thread for the new loop, but not sufficiently for it to be caught by the cam $Da$, so that when it is brought down again, it has two loops on, which remain on until the needle is again required for widening up the heel. To accomplish this I cut the under side of the cam $Da$ shorter so that the needles require lifting one-eighth inch higher to be caught by it, and the Jacquard plates have a thin piece of iron plate $L^{\times\times\times}$ riveted on them as shown in Fig. 3 so as to thicken them to the extent necessary to give the extra lift. Where I require to lift up a needle the lesser distance, this extra piece of iron is cut away, so as to lift it a less distance. This tucks one or more needles.

In some cases in making a stocking in place of commencing at the toe as above described and working the stocking upward I place on to the needles a rib top and work the stocking downward.

What I claim is—

1. The combination of two parallel needle beds, a thread layer, means for operating it, cams for raising and for lowering the needles reciprocated to and fro along each needle bed, the lowering cams being so formed as to lower the needles out of reach of the raising cams, a continuous chain of Jacquard cards for each needle bed, mechanism for bringing one of such cards against the ends of the needles just before a course of work is made on that bed so as to raise such of the needles as are to be brought into work and bring them within reach of the raising cam-control mechanism which controls whether the Jacquard mechanism shall come into action or remain out of action, and means for holding the advancing down-throw cam above the needles raised into action by the jacquard.

2. The combination of two parallel needle beds, a thread layer, means for operating it, cams for raising and for lowering the needles reciprocated to and fro along each needle bed, the lowering cams being so formed as to lower the needles out of reach of the raising cams, a Jacquard barrel with a continuous chain of cards passing over it below each needle bed,—mechanism for raising each Jacquard barrel against the ends of the needles of the bed above it just before a course of work is made on that bed,—mechanism for giving a partial turn to each Jacquard barrel as it is moved back away from the needles, control mechanism for bringing into action or not bringing into action the Jacquard barrels at each course and means for holding the advancing down-throw cam above the needles raised into action by the jacquard.

3. The combination of the two parallel needle beds one capable of being moved endwise to and fro, the thread layer, means for operating it, the cams for raising and lowering the needles; the lowering cams being so formed as to lower the needles below the reach of the raising cams, the Jacquard mechanism for raising needles in either bed, mechanism for shifting the bed endwise, the pattern chain for controlling its movements at the times required, so as when the work is to be widened to enable a needle which is to be brought into work at the end of one bed to be made to rise between the last two end needles in the other bed to have the thread with which a course of work is made on the needles of that bed laid across it, and means for holding the advancing down-throw cam above the needles raised into action by the jacquard.

4. The combination of the two parallel needle beds, one capable of being moved endwise to and fro, the thread layer, means for operating it, the cams for raising and lowering the needles, the lowering cams being so formed as to lower the needles below the reach of the raising cams, the Jacquard mechanism for raising the needles in either bed, and mechanism for retaining a splicing thread or allowing it to pass with the main thread into the work so as to splice or thicken the work produced either on the one bed or the other or on some of the needles on one bed and some on the other, and means for holding the advancing down-throw cam above the needles raised into action by the jacquard.

5. The combination of two parallel needle beds, a thread layer, means for operating the thread layer, cams for raising and lowering the needles means for operating them in such manner that work is first produced on the needles of one needle bed and then on the other so as to produce tubular work, a spring upon the thread layer having an eye for a thickening thread led through the same thread layer, the rocking lever engaging the spring for nipping and holding this thickening thread or allowing it to run free, and automatic mechanism for controlling the position of the lever to make it hold or release the thread at the times required, substantially as described.

WILLIAM TERTIUS ROWLETT.

Witnesses:
WM. BRAMLEY,
GEO. WM. COLTMAN,
*Clerks to Messrs. Stone & Co., Solrs., Leicester.*